(12) United States Patent
Kawakami (10) Patent No.: US 10,059,017 B2
(45) Date of Patent: Aug. 28, 2018

(54) TUBE CUTTING APPARATUS

(75) Inventor: Teruaki Kawakami, Osaka (JP)

(73) Assignee: Fuji Machine Works Co., Ltd., Osaka (JP)

( * ) Notice: Subject to any disclaimer, the term of this patent is extended or adjusted under 35 U.S.C. 154(b) by 1892 days.

(21) Appl. No.: 12/669,629

(22) PCT Filed: Jul. 18, 2008

(86) PCT No.: PCT/JP2008/063038
§ 371 (c)(1),
(2), (4) Date: Jan. 19, 2010

(87) PCT Pub. No.: WO2009/014095
PCT Pub. Date: Jan. 29, 2009

(65) Prior Publication Data
US 2010/0199821 A1    Aug. 12, 2010

(30) Foreign Application Priority Data

Jul. 20, 2007  (JP) ................................ 2007-189910

(51) Int. Cl.
*B23D 21/14*  (2006.01)
*B26D 3/16*  (2006.01)
(Continued)

(52) U.S. Cl.
CPC ............ *B26D 3/163* (2013.01); *B23D 21/14* (2013.01); *B26D 5/08* (2013.01); *B26D 3/164* (2013.01);
(Continued)

(58) Field of Classification Search
CPC ........ B23D 21/14; B23D 21/00; B23D 21/04; B23D 31/001; B26D 3/163; B26D 3/164;
(Continued)

(56) References Cited

U.S. PATENT DOCUMENTS

| | | | | |
|---|---|---|---|---|
| 2,139,682 A | * | 12/1938 | Hothersall | B23D 21/14 83/185 |
| 8,813,618 B2 | * | 8/2014 | Kawakami | B23D 21/14 83/185 |
| 2004/0074359 A1 | * | 4/2004 | Binggeli | B23D 21/14 83/178 |

FOREIGN PATENT DOCUMENTS

| | | |
|---|---|---|
| CN | 1705526 | 12/2005 |
| GB | 1156927 | 7/1969 |

(Continued)

OTHER PUBLICATIONS

International Search Report for corresponding Application No. PCT/JP2008/063038 dated Oct. 28, 2008.

*Primary Examiner* — Clark F Dexter
(74) *Attorney, Agent, or Firm* — Renner Otto Boisselle & Sklar, LLP (57) ABSTRACT

A tube cutting apparatus includes an inner blade, a drive shaft, a coupling shaft, a planetary gear, and a ring gear. The outer blade has an inner peripheral surface which contacts an entire circumference of an outer periphery of a work W so as to cover a predetermined axial range of the outer periphery. The drive shaft is rotatably supported inside the work W coaxially with the work W and defines a bore therethrough at a position decentered by a predetermined amount within the drive shaft. The coupling shaft is rotatably supported in the bore. The inner blade is rotatably retained on an eccentric shaft decentered at a front end portion of the coupling shaft and is positioned inside the work W. The planetary gear is positioned outside the work W and fitted on a rear end portion of the coupling shaft coaxially and meshes with the ring gear.

6 Claims, 7 Drawing Sheets

(51) Int. Cl.
  *B26D 5/08* (2006.01)
  *B26D 5/16* (2006.01)
(52) U.S. Cl.
  CPC ............. *B26D 5/16* (2013.01); *Y10T 83/0596* (2015.04); *Y10T 83/393* (2015.04); *Y10T 83/394* (2015.04)
(58) Field of Classification Search
  CPC ......... B26D 5/08; B26D 5/16; Y10T 83/0596; Y10T 83/384; Y10T 83/385; Y10T 83/392; Y10T 83/393; Y10T 83/394
  USPC ........ 83/54, 178, 179, 185, 187, 186; 30/95, 30/93
  See application file for complete search history.

(56) References Cited

FOREIGN PATENT DOCUMENTS

| | | | |
|---|---|---|---|
| JP | 59-16314 | | 1/1984 |
| JP | 02-071916 | | 3/1990 |
| JP | 2-117817 | * | 9/1990 |
| JP | 6-155143 | * | 6/1994 |
| JP | 07-136981 | | 5/1995 |
| JP | 07-171708 | | 7/1995 |
| JP | 2001-009629 | | 1/2001 |
| JP | 2002-210611 | | 7/2002 |
| WO | 2004/035239 A2 | | 4/2004 |

* cited by examiner

TUBE CUTTING APPARATUS

TECHNICAL FIELD

The present invention relates to a tube cutting apparatus configured to cut a thin-wall tube at a desired cut position in the axial direction thereof by expansion, as well as a tube manufacturing method.

BACKGROUND ART

A thin-wall metal tube having a predetermined length is manufactured by a process including: rounding a thin metal sheet having a larger length than the predetermined length in such manner that two parallel edges thereof are brought close to each other; welding the two edges together to form a cylindrical tube; and cutting the tube to the predetermined length. One known cutting apparatus for use in cutting such a tube is configured to move a cutting tool abutting against the outer peripheral surface of the tube toward the inside of the tube radially of the tube (see patent document 1 for example).

In cutting a thin-wall tube having a low strength with such an apparatus configured to move a cutting tool from the outer peripheral surface toward the inside of the tube, however, the thin-wall tube is deformed radially, thus lowering the roundness of the resulting product.

In view of this inconvenience, a tube cutting apparatus for use in cutting such a thin-wall tube has heretofore been proposed which is configured to position an outer blade so as to contact an outer peripheral surface of the tube and move an inner blade positioned inside the thin-wall tube toward the outside of the tube while rotating the inner blade.

In this case, use of a hollow shaft member and an inclined cam can be conceived for applying the inner blade with a moving force acting radially of the tube while transmitting rotation to the inner blade. The hollow shaft member is adapted to be inserted into the tube coaxially with the tube, supports thereon the inner blade by a retainer member at a predetermined axial position for rotation and radial movement, and accommodates therein the inclined cam abutting against the retainer member for axial movement.

As the inclined cam moves axially of the hollow shaft member with the hollow shaft member rotating, the position of contact between the retainer member and the inclined cam is displaced radially of the tube to cause the inner blade to move radially of the tube and rotate.

Patent Document: Japanese Patent Laid-Open Publication No. H7-136981

DISCLOSURE OF THE INVENTION

Problems to be Solved by the Invention

However, in order to move the inclined cam axially within the hollow shaft member while rotating the hollow shaft member on which an inner blade die is rotatably supported so as to be movable radially of the tube, the structure of the hollow shaft member to be inserted into the tube becomes complicated and upsized, resulting in a problem that the apparatus cannot be used to cut thin-wall tubes having relatively small diameters of about 100 mm.

Use of a link mechanism pivotally supported in a plane perpendicular to the axis of the tube can be conceived as a component for causing the inner blade to move radially of the tube and rotate. In this case also, a structure for causing the link mechanism to operate becomes complicated and upsized and, hence, the apparatus is not suitable for cutting of thin-wall tubes having relatively small diameters.

A feature of the present invention is to provide a tube cutting apparatus which is capable of cutting a thin-wall tube having a relatively small diameter by using a planetary gear mechanism positioned outside the tube to cause the inner blade to move radially of the tube and rotate.

Means for Solving the Problems

In order to solve the foregoing problems, the present invention includes an outer blade, an inner blade, and an inner blade driving mechanism. The outer blade is shaped annular and has an inner peripheral surface which contacts an entire circumference of an outer periphery of a tube to be cut so as to cover a predetermined axial range of the outer periphery. The inner blade is disc-shaped and retained inside the tube with a central axis thereof extending parallel with an axis of the tube and has at least one side surface positioned within the tube so as to substantially coincide with a side surface of the outer blade in an axial direction of the tube. The inner blade driving mechanism includes a ring gear and a planetary gear. The ring gear is positioned outside the tube coaxially with the tube. The planetary gear has external teeth meshing with internal teeth of the ring gear. The inner blade driving mechanism is configured to move the planetary gear along a pitch circle of the ring gear and has a first shaft serving as a central axis of the planetary gear and a second shaft extending parallel with the first shaft and supporting the inner blade for rotation, the second shaft being rotatably supported at a predetermined position which is different from a position of the first shaft in a plane perpendicular to the first shaft.

In this construction, the first shaft serving as the central axis of the planetary gear moves along a first circle centered on the axis of the tube. With this movement, the second shaft which extends parallel with the first shaft and supports the inner blade for rotation moves along a circle centered on the first shaft at an angular velocity that is different from that of the first shaft and depends on the difference in the number of teeth between the planetary gear and the ring gear. Specifically, when the planetary gear is caused to revolve along the pitch circle of the ring gear, the planetary gear rotates about its central axis at a higher angular velocity than its revolution because of the difference in the number of teeth between the planetary gear and the ring gear. The planetary gear rotating about its central axis causes the second shaft supporting the inner blade to rotate in a manner decentered to the first shaft, so that the position of a portion of the outer periphery of the inner blade rotatably supported on the second shaft which is most distant from the center of the tube changes gradually. As the position of the portion of the outer periphery of the inner blade which is most distant from the center of the tube moves further away from the center of the tube, the outer periphery of the inner blade contacts the inner periphery of the tube and then becomes exposed exteriorly of the tube, thereby cutting the tube cooperatively with the outer blade. At that time, the inner blade is caused to rotate about the second shaft by the resistance of the tube.

More specifically, the planetary gear which is fixed at one end of a coupling shaft and meshes with the ring gear positioned coaxially with the tube, revolves along the inner periphery of the ring gear while rotating about its central axis. Since the number of teeth of the planetary gear is smaller than that of the ring gear, the planetary gear rotates about its central axis more than one rotation by an extra amount corresponding to the difference in the number of teeth from the ring gear during one revolution along the inner periphery of the ring gear, so that the coupling shaft rotates in a bore more than one rotation during one rotation of the drive shaft.

As the drive shaft continues to rotate, the position of the inner blade which projects most outwardly of the tube along the circumference of the tube is gradually displaced in the direction opposite to the direction of rotation of the drive shaft by an amount corresponding to the difference in the number of teeth between the planetary gear and the ring gear per one rotation of the drive shaft. When N rotations of the drive shaft ($N=Z1/Z2$ where Z1 represents the number of teeth of the ring gear and Z2 represents the difference in the number of teeth between the ring gear and the planetary gear) is completed, the coupling shaft and the inner blade are returned into their initial positions. During the N rotations of the drive shaft, the inner blade becomes partially exposed exteriorly of the tube at N positions along the periphery of the tube, with the result that the tube is cut throughout its entire circumference. Since one side surface of the inner blade is positioned to substantially coincide with one side surface of the outer blade in the axial direction of the tube during cutting, the resulting cut surfaces of the tube are smooth.

In this construction, the inner blade driving mechanism may further include a drive shaft, a coupling shaft, an eccentric shaft, and driving means. The drive shaft is rotatably supported inside the tube coaxially with the tube and defines a bore which extends therethrough at an eccentric position decentered by a predetermined amount within the drive shaft, which has a circular section and which is open at opposite ends of the drive shaft. The coupling shaft is shaped cylindrical and rotatably supported in the bore and has a first end portion positioned inside the tube and a second end portion coaxially fixed to the planetary gear. The eccentric shaft is fixed to the first end portion of the coupling shaft and supports the inner blade for rotation at an eccentric position decentered from a central axis of the coupling shaft.

With this feature, as the drive shaft rotates, the coupling shaft rotates inside the tube eccentrically with respect to the axis of the tube. The inner blade which is retained at the first end portion of the coupling shaft rotates together with the coupling shaft while radially outwardly displacing the position of a portion of an outer periphery of the inner blade which is most distant radially from the central axis of the tube gradually. By appropriately setting the outer diameter of the inner blade, the outer periphery of the inner blade can become partially exposed exteriorly of the tube from the inside of the tube during rotation of the coupling shaft, thereby cutting the tube cooperatively with the outer blade.

The tube cutting apparatus having the feature described above may further comprise restraint means, fixing means, driving means, detection means, and control means, wherein the ring gear is rotatably supported coaxially with the drive shaft. The restraint means restrains rotation of the ring gear when necessary. The fixing means fixes the ring gear and the planetary gear together when necessary. The detection means detects a rotational position of the drive shaft. The control means is configured to enable the restraint means and disable the fixing means during rotation of the drive shaft through a predetermined angle from an initial rotational position as well as to disable the restraint means and enable the fixing means during one rotation of the drive shaft after the drive shaft has rotated through the predetermined angle.

Until the drive shaft rotates through the predetermined angle, the planetary gear rotates along the inner periphery of the ring gear restrained from rotation by the restraint means independently of the ring gear, so that the inner blade becomes partially exposed exteriorly of the tube gradually. When the inner blade has become partially exposed exteriorly of the tube and the rotational angle of the drive shaft has reached the predetermined angle, the ring gear is released from the state in which its rotation is restrained by the restraint means, while the ring gear and the planetary gear are fixed together by the fixing means. The planetary gear rotates together with the ring gear rotatably supported coaxially with the tube, so that the inner blade performs one 360° rotation about the axis of the tube together with the coupling shaft without varying the amount of exposure on the exterior of the tube. Thus, the tube can be cut throughout its entire circumference only by one rotation of the drive shaft from the position reached by rotation through the predetermined angle.

In this case, it is possible that: the driving means is configured to transmit forward rotation and backward rotation to the drive shaft selectively; and the control means is configured to cause the driving means to transmit the forward rotation to the drive shaft during the one rotation of the drive shaft after the drive shaft has rotated through the predetermined angle from the initial rotational position and the backward rotation to the drive shaft until the drive shaft returns to the initial rotational position after the one rotation of the drive shaft from the position of the drive shaft having rotated through the predetermined angle has been completed.

By backwardly rotating the drive shaft after the cutting of the tube, it is possible to return not only the rotational position of the drive shaft but also the positional relation between the ring gear and the planetary gear which are different in the number of teeth from each other to their initial states earlier.

It is possible that the outer blade defines a gap extending therethrough so as to be opposed to the inner blade and contacts the outer periphery of the tube in two opposite regions across the gap in the axial direction of the tube. In this case, two side surfaces of the inner blade which are opposite from each other in the axial direction of the tube are each positioned to substantially coincide with a respective one of two side surfaces of the outer blade which face each other across the gap, with the result that the tube can be smoothly cut at opposite sides across the gap. Thus, it is possible to cut the tube into two segments at an intermediate portion thereof, thereby to obtain a plurality of products of a desired length from a tube of continuous length without requiring complicated post-processing.

Further, the coupling shaft may include a retainer mechanism for retaining the inner blade at the first end portion for rotation about the axis of the tube. When the coupling shaft rotates about its axis in the bore while revolving eccentrically about the axis of the drive shaft with rotation of the drive shaft, the inner blade rotates without being constrained by the coupling shaft. Therefore, the periphery of the inner blade fails to slide on the inner periphery of the tube and, hence, a large frictional force is not exerted between the two. For this reason, it is possible to reduce the driving force to be supplied to the drive shaft for rotation of the inner blade to a relatively small value.

Effects of the Invention

According to the present invention, the inner blade is rotated at a position decentered by the predetermined amount from the axis of the tube together with the planetary gear meshing with the ring gear positioned outside the tube coaxially with the tube, so that the inner blade becomes gradually exposed exteriorly of the tube from the inside of the tube, thereby cutting the tube cooperatively with the outer blade. Since the inner blade is displaced radially of the tube, the structure to be positioned inside the tube can be simplified and, hence, a tube having a relatively small diameter can be cut smoothly.

DESCRIPTION OF REFERENCE NUMBERS

1 . . . drive shaft
2 . . . coupling shaft
3 . . . inner blade
4 . . . outer blade
5 . . . planetary gear
6 . . . ring gear
7 . . . sleeve
9 . . . fixing mechanism (fixing means)
10 . . . air cylinder (restraint means)
13 . . . detection plate (detection means)
14A to 14C . . . photosensors (detection means)
100 . . . tube cutting apparatus
200 . . . control section
W . . . work (tube)

BEST MODE FOR CARRYING OUT THE INVENTION

Figure 1:
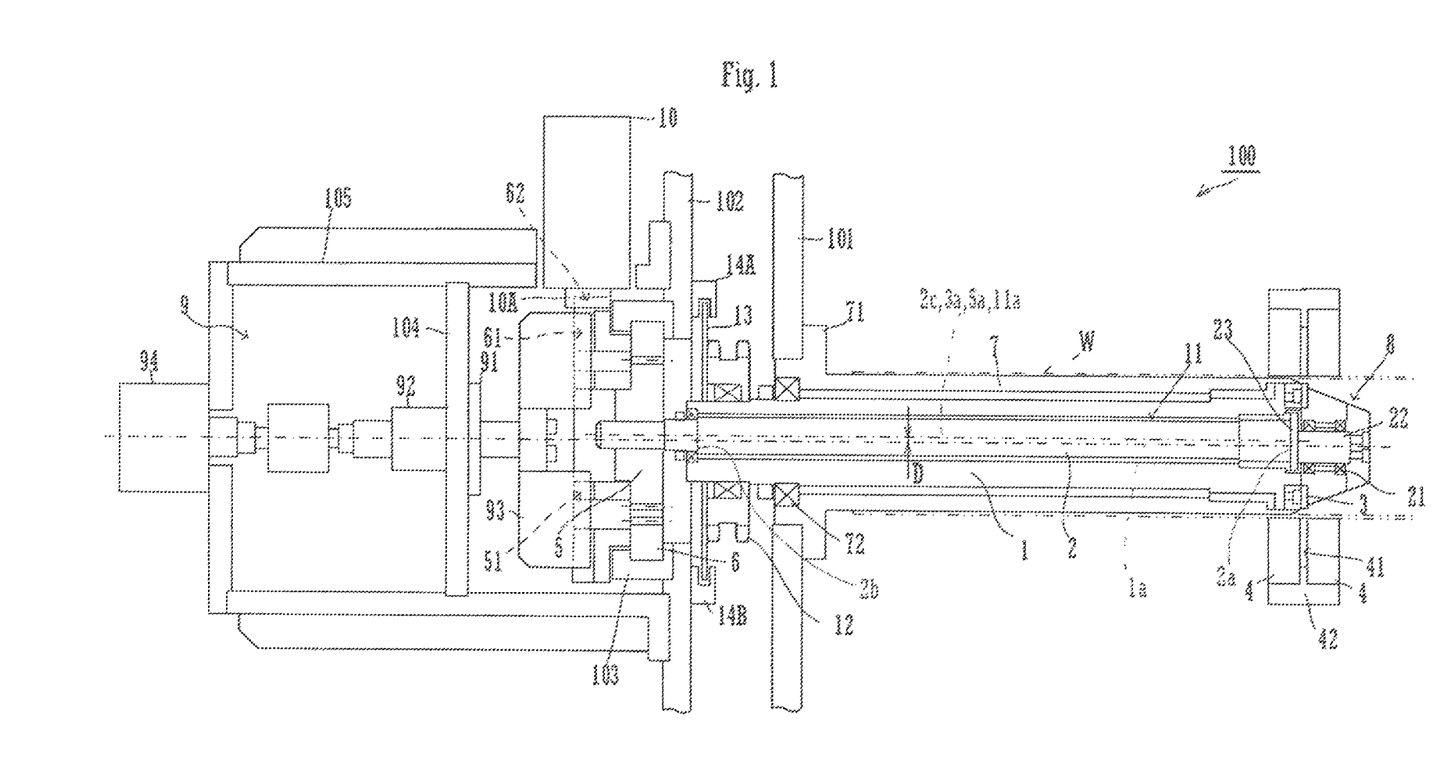
FIG. 1 is a sectional side elevational view illustrating a tube cutting apparatus according to an embodiment of the present invention.

Hereinafter, embodiments of the present invention will be described with reference to the drawings. FIG. 1 is a sectional side elevational view illustrating a tube cutting apparatus 100 according to an embodiment of the present invention. The tube cutting apparatus 100 is for use in a manufacturing operation for manufacturing a tube product having a predetermined length from a work W, an example of which is a thin-wall tube made of a metal such as stainless steel. The tube cutting apparatus 100 includes an inner blade driving mechanism comprising a drive shaft 1, a coupling shaft 2, an inner blade 3, an outer blade 4, a planetary gear 5, a ring gear 6, a sleeve 7, and an eccentric shaft 22.

The sleeve 7 is shaped cylindrical and fixed to a frame 101 by a flange portion 71. The work W is fitted over the sleeve 7.

The drive shaft 1 is inserted into the sleeve 7 coaxially and is rotatably supported in the sleeve 7 by means of a bearing 72 or the like. The drive shaft 1 has a bore 11 axially extending therethrough. The bore 11 has a circular cross-section centered on a center axis 11a decentered by a predetermined amount D from a center axis 1a of the drive shaft 1. A pulley 12 is fixed to a rear end portion of the drive shaft 1. A non-illustrated motor transmits rotation to the drive shaft 1 via the pulley 12.

A detection plate 13 is fixed to the pulley 12. The detection plate 13 has an outer peripheral portion partially formed with an increased diameter portion. A frame 102, which is positioned on the back side of the pulley 12, is fitted with photosensors 14A to 14C. (The photosensor 14C is not shown in FIG. 1.) The increased diameter portion of the detection plate 13 passes between a light-emitting device and a light-receiving device of each photosensor. The detection plate 13 and the photosensors 14A to 14C form part of detection means defined by the present invention. The photosensors 14A to 14C each output a detection signal indicative of detection of the increased diameter portion at a rotational position of the drive shaft 1.

The coupling shaft 2 is shaped cylindrical with a portion having a different diameter from the rest and is inserted in the bore 11. The coupling shaft 2 is rotatably supported in the bore 11. The coupling shaft 2 has a front end portion 2a (equivalent to a first end portion defined by the present invention) to be positioned inside the work W and a rear end portion 2b (equivalent to a second end portion defined by the present invention) to be positioned rearwardly outside the work W.

The eccentric shaft 22 is formed integrally with the coupling shaft 2 so as to project from the front end portion of the coupling shaft 2 via a flange portion 23.

The inner blade 3, the material of which is SKD11 for example, is disc-shaped with a central opening and retained at the front end portion of the coupling shaft 2 by means of a retainer mechanism 8.

A pair of outer blades 4 are each shaped annular and are fitted over the work W. A holder 42 holds the pair of outer blades 4 in such a manner that the outer blades 4 are spaced apart from each other by a gap 41 defined centrally of the pair of outer blades 4 in the axial direction of the work W while substantially contacting the entire circumference of the work W in opposite regions lying across the gap 41. The gap 41 is positioned so as to be opposed to a peripheral surface of the inner blade 3 across the work W. In the axial direction of the work W, the opposite side surfaces of the inner blade 3 are each positioned so as to substantially coincide with a respective one of the two facing side surfaces of the outer blades 4 defining the gap 41 therebetween.

The ring gear 6 is positioned outside the work W at the rear end side of the coupling shaft 2 and rotatably supported by a bearing 103 mounted on the frame 102. The ring gear 6 is placed coaxially with the work W, drive shaft 1 and sleeve 7.

The planetary gear 5 is fixed to the rear end portion 2b of the coupling shaft 2 coaxially with the coupling shaft 2 and the bore 11. The planetary gear 5 meshes with the ring gear 6. The number of teeth of the planetary gear 5 is smaller than that of the ring gear 6 and is determined depending on the decentering amount D of the coupling shaft 2 from the axis of the work W. For instance, in the case where the decentering amount D is 5 mm and the external teeth of the planetary gear 5 and the internal teeth of the ring gear 6 have a module of 2.5, when the number of teeth of the ring gear 6 is 50, the number of teeth of the planetary gear 5 is set to 46. The planetary gear 5 and the ring gear 6 are formed with dents 51 and 61, respectively, on their respective back sides. The ring gear 6 has a notch 62 in a portion of an outer peripheral surface thereof.

A fixing mechanism 9 is disposed behind the planetary gear 5 and the ring gear 6. The fixing mechanism 9, which is equivalent to fixing means defined by the present invention, is housed in a cover 105. A support member 104 is fixed in the cover 105. The fixing mechanism 9 includes a guide 91, a shaft 92, a fixing key 93, and an air cylinder 94. The guide 91 is mounted as extending through the support member 104 to the front and the rear. The shaft 92 is supported as extending through the guide 91 for sliding movement to the front and the rear. The fixing key 93 is fixed to a front end portion of the shaft 92 so as to be opposed to the back sides of the planetary gear 5 and ring gear 6. The air cylinder 94 serves to move the shaft 92 to the front and the rear by pneumatic pressure.

An air cylinder 10 is disposed above the ring gear 6. The air cylinder 10, which is equivalent to restraint means defined by the present invention, is fixed to a top of the cover 105. The air cylinder 10 includes a pin 10A which faces an outer peripheral surface of the ring gear 6.

In a manufacturing operation for manufacturing a tube product, a thin metal sheet is rounded in such a manner that parallel opposite edges thereof meet each other, and then the opposite edges are welded together to form the work W having a cylindrical shape of continuous length. After the work W has been fitted over the sleeve 7 from its one end, the pair of outer blades 4 are positioned in such a manner that their inner peripheral surfaces contact the entire circumference of an outer periphery of the work W so as to cover a predetermined axial range of the outer periphery. At that time, the opposite side surfaces of the inner blade 3 are each positioned so as to substantially coincide with a respective one of the facing side surfaces of the pair of outer blades 4 in the axial direction of the work W. With the outer blades 4 and inner blade 3 thus positioned, the drive shaft 1 is caused to rotate.

Figure 2:
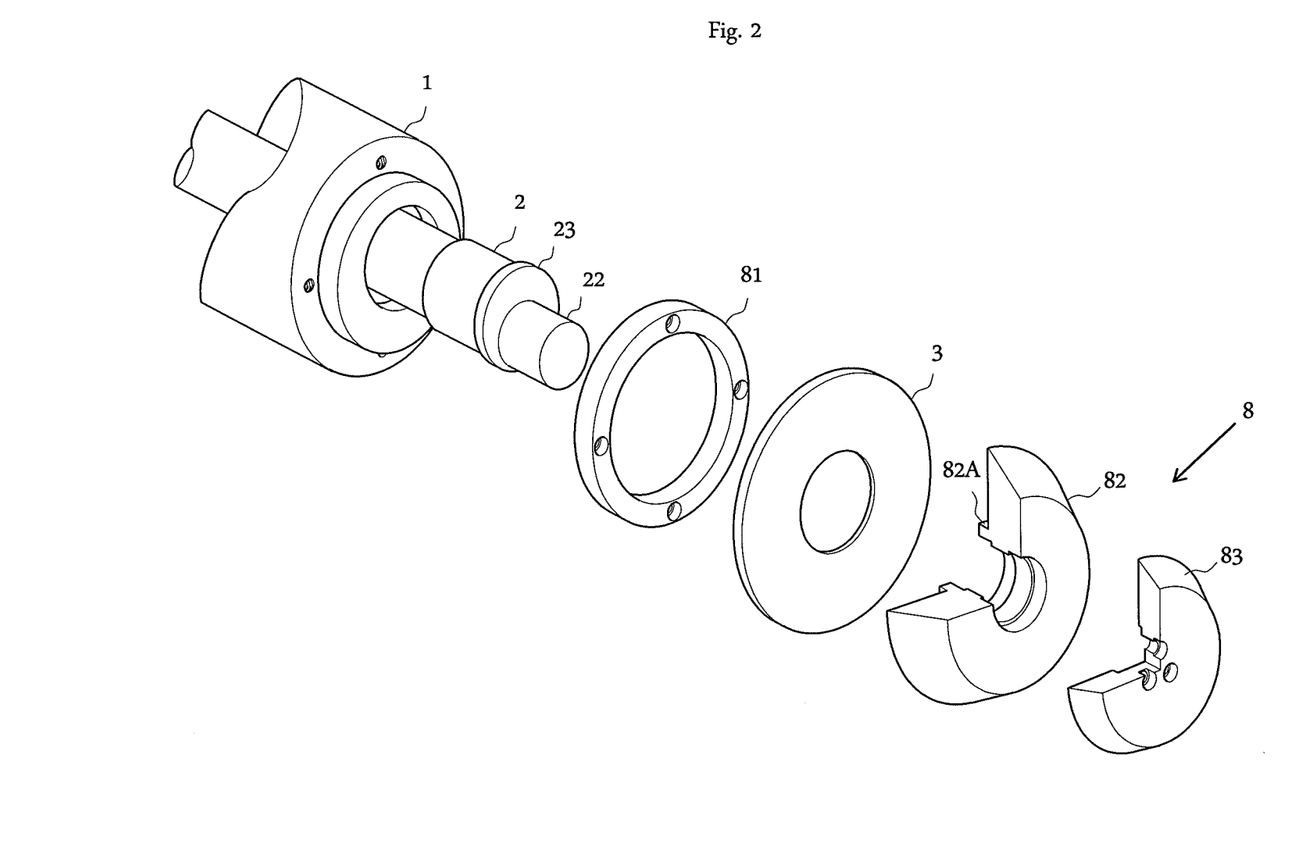
FIG. 2 is a view illustrating an arrangement of a retainer mechanism.

FIG. 2 is a view illustrating an arrangement of the retainer mechanism 8. The retainer mechanism 8 includes a ring member 81, a first cap member 82, and a second cap member 83 and serves to retain the inner blade 3 at the front end portion 2a of the coupling shaft 2 for rotation.

The ring member 81 is made of a tool steel material, such as SKD11 for example, like the inner blade 3, shaped annular and fixed to the front end surface of the drive shaft 1. Since the material of the drive shaft 1 has a lower hardness than the inner blade 3, it is possible that the front end surface of the drive shaft 1 is worn by rubbing and friction with the back side surface of the inner blade 3. Wear of the front end surface of the drive shaft 1 causes the axial position of the inner blade 3 to fluctuate, which makes precision cutting impossible. For this reason, the front end surface of the drive shaft 1 is protected from wear by the provision of the ring member 81 covering a portion of the front end surface of the drive shaft 1 which would be subjected to rubbing and friction with the inner blade 3.

The first cap member 82 is made of a tool steel material, such as SKD11 for example, like the inner blade 3, shaped annular with a front side surface having a smaller outer diameter than its back side surface, and rotatably supported on the eccentric shaft 22 of the coupling shaft 2 by means of a bearing 21 (see FIG. 1). The back side surface of the first cap member 82 is formed with a boss portion 82A. The boss portion 82A has an outer diameter substantially equal to the inner diameter of the inner blade 3 and extends axially from the back side surface of the first cap member 82 to a length substantially equal to the width of the inner blade 3. The first cap member 82 retains the inner blade 3 fitted over the boss portion 82A cooperatively with the ring member 81.

The second cap member 83 is shaped annular with a front side surface having a smaller outer diameter than its back side surface. The second cap member 83 is fitted on the front surface of the eccentric shaft 22 by means of a fixing screw (not shown) and restrains the inner blade 3 and first cap member 82 from moving axially. Since the second cap member 83 fails to contact the inner blade 3, a relatively inexpensive material, such as S45C, can be used to form the second cap member 83.

After the ring member 81 has been fitted on the front end surface of the drive shaft 1, the first cap member 82 is fitted over the eccentric shaft 22 with the inner blade 3 fitted over the boss portion 82A, and then the second cap member 83 is fitted on the front end surface of the eccentric shaft 22. By so doing, the inner blade 3 is rotatably retained at the front end portion of the coupling shaft 2.

Figure 3:
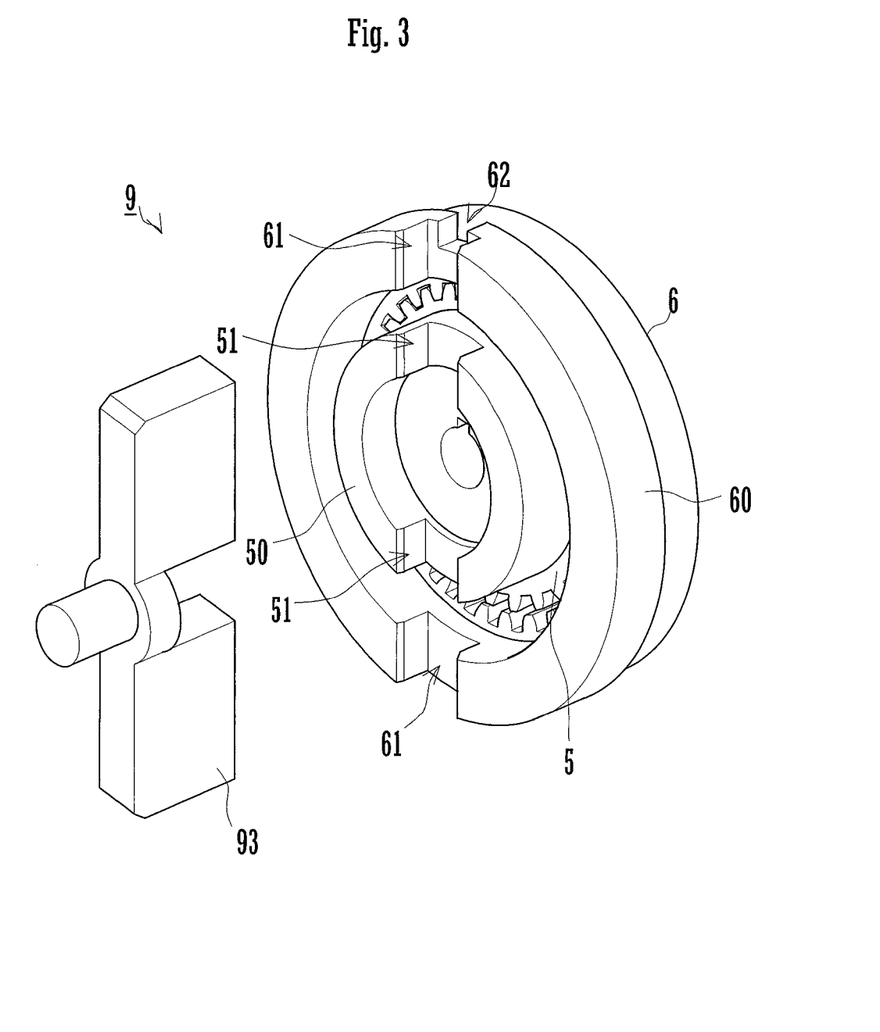
FIG. 3 is a perspective view, as viewed from the back side, of a fixing mechanism.

FIG. 3 is a perspective view, as viewed from the rear side, of a portion of the fixing mechanism 9. On the back side surface of the planetary gear 5, an annular positioning member 50 is fixed coaxially. The positioning member 50 is formed with two dents 51 which are radially open on the back side of the positioning member 50 and which are positioned at two points forming a rotation angle of 180° on the circumference of the positioning member 50. On the back side surface of the ring gear 6, an annular positioning member 60 is fixed coaxially. The positioning member 60 is formed with two dents 61 which are radially open on the back side of the positioning member 61 and which are positioned at two points forming a rotation angle of 180° on the circumference of the positioning member 60. The dents 51 and the dents 61 have equal widths in the circumferential direction.

The positioning member 60 is formed with a notch 62 at an outer peripheral portion facing the pin 10A of the above-described air cylinder 10. When the air cylinder 10 is actuated, the pin 10A is fitted into the notch 62 to restrain rotation of the ring gear 6.

With the coupling shaft 2 at an initial rotational position (i.e., starting point), the planetary gear 5 assumes an uppermost position within the ring gear 6 as shown in FIG. 3. At that time, the two dents 51 and the two dents 61 are aligned vertically. With the coupling shaft 2 positioned at a 180° rotational position by rotation from the initial rotational position (i.e., starting point), the planetary gear 6 assumes a lowermost position within the ring gear 6. At that time also, the two dents 51 and the two dents 61 are aligned vertically.

As described above, the fixing mechanism 9 includes the fixing key 93 which can be moved along the X-axis by the air cylinder 94. The fixing key 93 is plate-shaped with a width substantially equal to the width of the dents 51 and 61. When the coupling shaft 2 assumes the initial rotational position or the 180° rotational position from the initial rotational position, actuation of the air cylinder 94 causes the fixing key 93 to move toward the planetary gear 5 and the ring gear 6 along the X-axis and become fitted into the dents 51 and dents 61. When the fixing key 93 is fitted into the dents 51 and 61, the planetary gear 5 and the ring gear 6 are fixed together. When the air cylinder 94 becomes unactuated, the fixing key 93 is rearwardly retracted along the X-axis and hence fails to be fitted into the dents 51 and 61.

With the pin 10A fitted in the notch 62 and the fixing key 93 not fitted in the dents 51 and 61, when rotation is transmitted to the drive shaft 1, the coupling shaft 2, which is rotatably supported eccentrically with respect to the drive shaft 1, moves on a circle radially spaced by a predetermined distance from the central axis 1a of the drive shaft 1. The planetary gear 5, which is fixed to the rear end portion of the coupling shaft 1, moves on the same circle as does the coupling shaft 2 while meshing with the ring gear 6. Accordingly, the planetary gear 5 rotates about the central axis 2*c* of the coupling shaft 2 within the ring gear 6 while revolving along the inner periphery of the ring gear 6. The rotation of the planetary gear 5 causes the coupling shaft 2 to rotate about its central axis 2*c*, with the result that the inner blade 3 retained in the eccentric position at the front end portion 2*a* of the coupling shaft 2 rotates in a plane perpendicular to the central axes 1*a*, 2*c* of the drive shaft 1 and coupling shaft 2 while displacing its outermost position in the radial direction of the drive shaft 1.

With the pin 10A not fitted in the notch 62 and with the planetary gear 5 and the ring gear 6 fixed together, when rotation is transmitted to the drive shaft 1, the ring gear 6 and the planetary gear 5 move together. Accordingly, the planetary gear 5 fails to rotate about its central axis 5*a* and, hence, the coupling shaft 2 also fails to rotate about its central axis 2*c* and moves on a circle radially spaced by the predetermined distance from the central axis 1*a* of the drive shaft 1. The inner blade 3, which is retained in the eccentric position at the front end portion 2*a* of the coupling shaft 2, rotates in the plane perpendicular to the central axes 1*a*, 2*c* of the drive shaft 1 and coupling shaft 2 while keeping the distance from the central axis 1*a* of the drive shaft 1 constant without displacing its outermost position in the radial direction of the drive shaft 1.

The fixing mechanism 9 is not limited to the arrangement illustrated in FIG. 3, but may employ various arrangements as long as the planetary gear 5 and the ring gear 6 can be united together when necessary. Likewise, the air cylinder 10 may use various mechanisms as long as they can restrain rotation of the ring gear 6 when necessary.

The positioning members 50 and 60 may be formed integrally with the planetary gear 5 and the ring gear 6, respectively.

Figure 4:
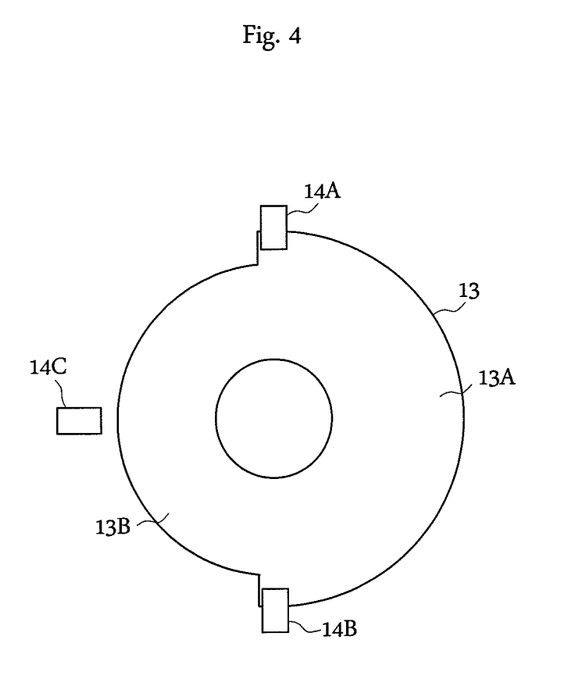
FIG. 4 is a front elevational view of a detection plate.

FIG. 4 is a front elevational view of the detection plate 13. The detection plate 13 is disc-shaped with a larger circle portion 13A and a smaller circle portion 13B which are different in radius from each other and are positioned concentrically.

Each of the photosensors 14A to 14C is disposed at such a position as to allow the outer peripheral edge of the larger circle portion 13A of the detection plate 13 to pass between its light-emitting device and light-receiving device. Specifically, the pairs of light-emitting device and light-receiving device of the respective photosensors 14A to 14C are disposed at two intersections of a circle having an intermediate radius between the radius of the larger circle portion 13A and that of the smaller circle portion 13B and a vertical line passing through the center of the detection plate 13 and at one intersection of that circle and a horizontal line passing through the center of the detection plate 13.

Instead of the photosensors 14A to 14C, use may be made of sensors of any type other than the optical type, such as a proximity sensor and a magnetic sensor, as long as they can detect the rotational position of the drive shaft 1.

Figure 5:
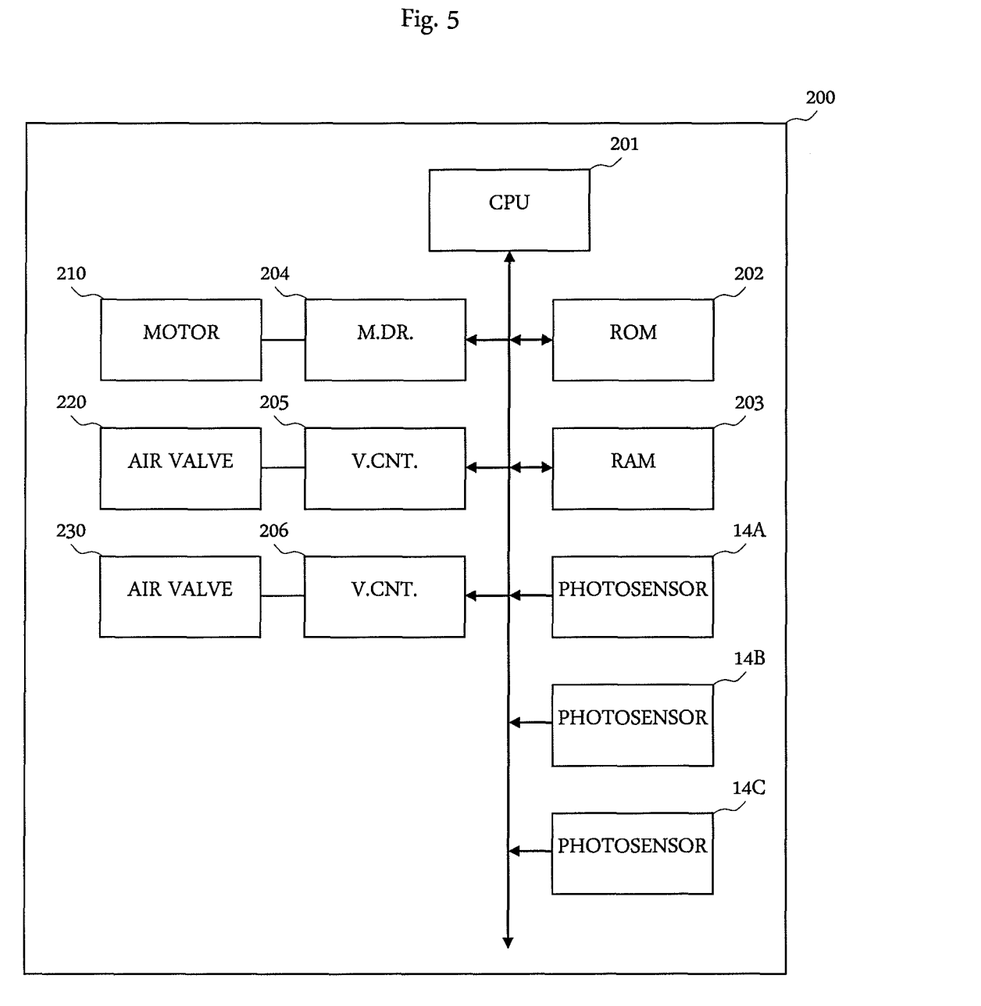
FIG. 5 is a block diagram illustrating a control section.

FIG. 5 is a block diagram illustrating a control section 200 according to the present invention. The control section 200 is constructed by connecting a CPU 201 to each of ROM 202, RAM 203, photosensors 14A to 14C, motor driver 204, valve controllers 205 and 206, and like components.

The ROM 202 has stored therein programs according to which the CPU 201 performs its operations. The RAM 203 has memory areas assigned to a working area and a storage area for data to be inputted and outputted. The photosensors 14A to 14C each input a detection signal upon detection of light from the light-emitting device by the light-receiving device. The motor driver 204 is connected to a motor 210 which transmits rotation to the drive shaft 1. The valve controller 205 is connected to an air valve 220 which opens and closes a flow path of pressurized gas to the air cylinder 10. The valve controller 206 is connected to an air valve 230 which opens and closes a flow path of pressurized gas to the air cylinder 94.

Based on detection signals from the photosensors 14A to 14C, the CPU 201 outputs driving data to the motor driver 204 and the valve controllers 205 and 206. The motor driver 204 drives the motor 210 in accordance with the driving data outputted from the CPU 201. The valve controllers 205 and 206 cause the respective valves 220 and 230 to be actuated in accordance with the driving data outputted from the CPU 201. When actuated, the valve 220 supplies the air cylinder 10 with pressurized gas to restrain rotation of the ring gear 6. When actuated, the valve 230 supplies the air cylinder 94 with pressurized gas to unite the planetary gear 5 and ring gear 6 together by means of the fixing key 93.

Figure 6:
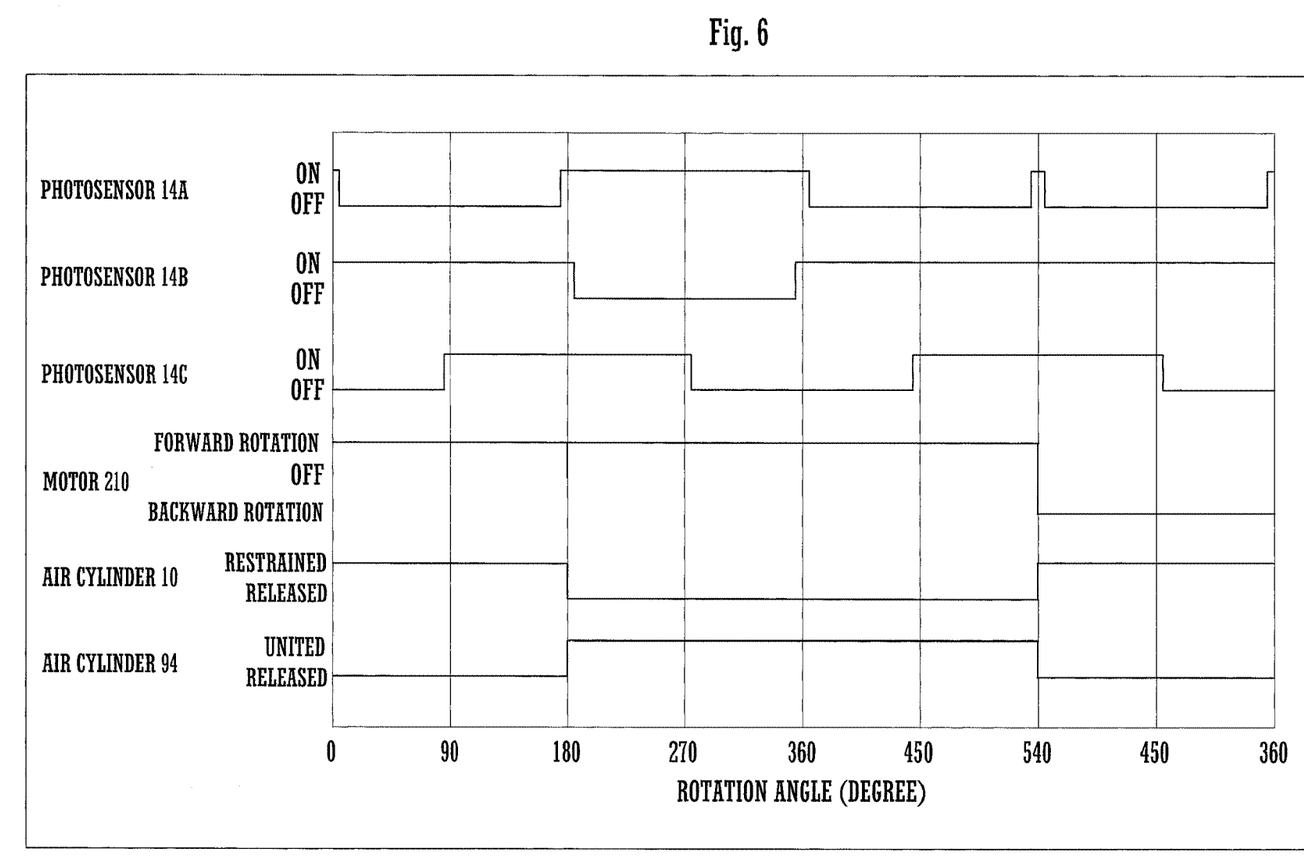
FIG. 6 is a timing chart illustrating details of control performed by the control section.

FIG. 6 is a timing chart illustrating details of control performed by the control section 200. The CPU 201 causes the motor 210 and the air cylinders 10 and 94 to operate in accordance with the detection status of the photosensors 14A to 14C detecting the detection plate 13. When the drive shaft 1 is in the initial rotational position, the photosensors 14A and 14B detect the detection plate 13, whereas the photosensor 14C fails to detect the detection plate 13, as shown in FIG. 4. At that time, when an instruction to start cutting of the work W is given after the work W has been fitted over the sleeve 7, the CPU 201 actuates the valve 202 to cause the pin 10A of the air cylinder 10 to restrain rotation of the ring gear 6 while causing the motor 210 to start forward rotation via the motor driver 204, with the planetary gear 5 and the ring gear 6 being not united together by means of the fixing key 93 by failure to actuate the valve 230.

During the forward rotation of the motor 210, the detection plate 13 rotates clockwise in FIG. 4 together with the drive shaft 1. Therefore, the photosensor 14A fails to detect the detection plate 13 immediately after the forward rotation of the motor 210 has started. When the drive shaft 1 has rotated 90° from the initial position, the photosenstor 14C begins detecting the detection plate 13.

With the rotation of the drive shaft 1, the coupling shaft 2 rotates about its central axis 2*c* within the bore 11 while revolving about the central axis 1*a* of the drive shaft 1 at the position of the bore 11. With this movement, the eccentric shaft 22, together with the inner blade 3, rotates about the central axis 2*c* of the coupling shaft 2. The inner blade 3 gradually displaces its outer peripheral position radially outwardly. The outer peripheral position of the inner blade 3 reaches the outermost position when the drive shaft 1 has rotated 180° from the initial position. While the drive shaft 1 rotates 180° from the initial position, the inner blade 3 displaces its outer peripheral portion from the inside to the outside of the work W, thereby cutting the work W in cooperation with the outer blades 4. At the time the drive shaft 1 has rotated 180° from the initial position, the outer peripheral portion of the inner blade 3 is displaced to its the outermost position.

When the drive shaft 1 has rotated 180° from the initial position and all the photosensors 14A to 14C have detected the detection plate 13, the CPU 201 stops driving the motor 210 temporarily. During the temporary stop, the CPU 201 stops the actuation of the valve 220 to release the ring gear 6 from the state in which its rotation is restrained by the pin 10A of the air cylinder 10. Thereafter, the CPU 201 causes the motor 210 to rotate forwardly again with the planetary gear 5 and the ring gear 6 united together by the fixing key 93 operated by actuation of the valve 230.

After the motor 210 has resumed the forward rotation, the planetary gear 5 and the ring gear 6 rotate together and, hence, the coupling shaft 2 moves about the central axis 1a of the drive shaft 1 without rotating about its central axis 2c within the bore 11. For this reason, the inner blade 3 moves about the central axis 1a of the drive shaft 1 together with the coupling shaft 2 with the outer peripheral portion of the inner blade 3 remaining in the outermost position in the radial direction of the drive shaft 1 without displacement, thus continuing to cut the work W in cooperation with the outer blades 4. At that time, the inner blade 3 is caused to rotate about its central axis 3a by a contact resistance between the inner blade 3 and the work W because the inner blade 3 is rotatably retained on the eccentric shaft 22 at the front end portion 2a of the coupling shaft 2. Therefore, a high resistance does not work against the movement of the inner blade 3 and, hence, there is no need to use a motor of a high output power as the motor 210. Also, the inner blade 3 will not be worn at an early stage because portions of the outer periphery and side surfaces of the inner blade 3 which contact the work W are displaced gradually.

When the drive shaft 1 has rotated 360° after the restart of the forward rotation of motor 210 and all the photosensors 14A to 14C have detected the detection plate 13 again, the CPU 201 temporarily stops driving the motor 210 again. During the temporary stop, the CPU 201 actuates the valve 220 to restrain rotation of the ring gear 6 by means of the pin 10A of the air cylinder 10 and stops actuating the valve 230 to release the planetary gear 5 and the ring gear 6 from the state in which they are united together by the fixing key 93. Thereafter, the CPU 201 causes the motor 210 to rotate 180° backwardly so as to return the drive shaft 1 into the initial position, thus completing one-time cutting of the work W.

The tube cutting apparatus 100 which carries out the process described above makes it possible to easily cut the thin-wall work W having a relatively small diameter by using the planetary gear mechanism comprising the planetary gear 5 and the ring gear 6 to cause the inner blade 3 to rotate as well as to be displaced radially of the work W.

The reason why the drive shaft 1 is returned into the initial position by causing the motor 210 to rotate backwardly is to prevent the rotation angle of the coupling shaft 2 from changing from the initial state due to the difference in the number of teeth between the planetary gear 5 and the ring gear 6.

In cutting the work W, a portion of the outer peripheral edge of the inner blade 3 which becomes exposed exteriorly of the work W is fitted into the gap 41 defined between the pair of outer blades 4, so that the front and back side surfaces of the inner blade 3 are brought into contact with the two side surfaces of the outer blades 4 which face each other across the gap 41. Though a force works in such a direction as to press the cut surfaces of the work W outwardly by the outer periphery of the inner blade 3 pressing against the work W, the inner peripheral surfaces of the pair of outer blades 4 abut against the outer peripheral surface of the work W on the opposite sides of the cut portion, thereby preventing serious deformation, such as a burr, from occurring at the cut surfaces of the work W. Therefore, there is no need to perform post-processing, such as machining, on the cut surfaces of the work W after the cutting of the work W. The tube cutting apparatus 100 can perform successive cutting operations on the work W of continuous length to obtain a plurality of individual tubes each having a short axial length.

In cutting out an end portion of the work W, it is sufficient for the outer blades 4 to be positioned only on the back side of the inner blade 3 in the axial direction of the work W.

It is conceivable that the motor 210 is driven at a higher speed in order to speed up the cutting operation on the work W. In this case, the motor 210 may be driven at a lower speed when the drive shaft 1 is within predetermined angle ranges before the temporary stop of rotation and before the completion of the cutting operation, in view of the braking ability for stop. For example, the motor 210 is driven at a higher speed during forward rotation of the drive shaft 1 within rotational position ranges from the initial position to the 90° position and from the 180° position to the 450° position and during backward rotation of the drive shaft 1 within a rotational position range from the 540° position to the 450° position while being driven at a lower speed during forward rotation of the drive shaft 1 within rotational position ranges from the 90° position to the 180° position and from the 450° position to the 540° position and during backward rotation of the drive shaft 1 within a rotational position range from the 450° position to the 360° position.

The tube cutting apparatus 100 can cut works W having different diameters by replacement of the sleeve 7, inner blade 3 and outer blades 4. In this case, it is possible to accommodate increases in work diameter by using the sleeve 7 having an outer diameter suited to a work W having a minimum diameter and an adjustment sleeve having an inner diameter substantially equal to the outer diameter of the sleeve 7 and an outer diameter substantially equal to the inner diameter of a work W having an increased diameter and fitting the adjustment sleeve over the sleeve 7.

It is possible to eliminate the fixing mechanism 9 and the air cylinder 10 by fixing the ring gear 6 on the frame 102. As the drive shaft 1 rotates in the direction indicated by arrow A in FIG. 7, a first shaft 2A which serves as the center of the planetary gear 5 (as well as the center of the coupling shaft 2) moves along a first circle C1 centered on the central axis of the work W. With this movement, the coupling shaft 2 rotates in the direction indicated by arrow B, so that a second shaft 22A which serves as the center of the eccentric shaft 22 extending parallel with the first shaft 2A and supporting the inner blade for rotation moves along a second circle C2 centered on the first shaft 2A at an angular velocity that is different from that of the first shaft 2A and depends on the difference in the number of teeth between the planetary gear 5 and the ring gear 6. (In the example shown, the second shaft 22A coincides with the center of the work W when in the initial position.) Actually, the center of the circle C2 moves along the circle C1.

That is, since the planetary gear 5 revolves along the pitch circle of the ring gear 6, the planetary gear 5 rotates about its central axis at a higher angular velocity than its revolution because of the difference in the number of teeth between the planetary gear 5 and the ring gear 6. As the planetary gear 5 and the coupling shaft 2 rotate, the eccentric shaft 22 supporting the inner blade 3 for rotation rotates about the central axis of the coupling shaft 2 eccentrically, with the result that the distance between the center of the work W and a portion of the outer periphery of the inner blade 3 which is most distant from the center of the work W varies gradually. For example, when the drive shaft 1 has rotated 180° from the initial position shown in FIG. 7, the distance between the center of the work W and the portion of the outer periphery of the inner blade 3 which is most distant from the center of the work W is maximized, so that the portion of concern reaches a position P1 depicted by broken line in the schematic view in FIG. 7 and becomes exposed exteriorly of the work W. At that time, the inner blade 3 is caused to rotate about the second shaft 22A (which is not in the position shown in FIG. 7) by the resistance of the work W.

Figure 7:
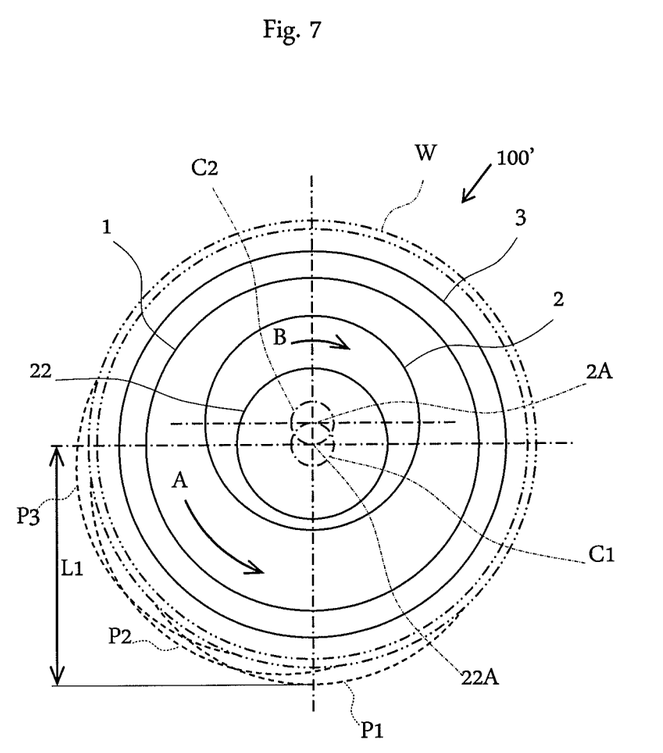
FIG. 7 is a front elevational view illustrating displacement of an inner blade 3 of a tube cutting apparatus according to another embodiment of the present invention.

In the embodiment illustrated in FIGS. 1 to 6, the planetary gear 5 and the ring gear 6 are united together when the inner blade 3 reaches the position P1 in FIG. 7, so that the inner blade 3 rotates 360° while keeping the distance L1 between the center of the work W and the portion of the outer periphery of the inner blade 3 which is most distant from the center of the work W.

The planetary gear 5 meshing with the ring gear 6 positioned coaxially with the work W revolves along the inner periphery of the ring gear 6 while rotating about its central axis. Since the number of teeth of the planetary gear 5 is smaller than that of the ring gear 6, the planetary gear 5 rotates about its central axis more than one rotation by an extra amount corresponding to the difference in the number of teeth from the ring gear 6 during one revolution along the inner periphery of the ring gear 6, so that the coupling shaft 2 rotates in the bore 11 more than one rotation during one rotation of the drive shaft 1.

As the drive shaft 1 continues to rotate, the position of the inner blade 3 which projects most outwardly of the work W is gradually displaced from the position P1 to the position P2 and from the position P2 to the position P3 in FIG. 7 in the direction opposite to the direction of rotation of the drive shaft 1 by the amount corresponding to the difference in the number of teeth between the planetary gear 5 and the ring gear 6 per one rotation of the drive shaft 1. When N rotations of the drive shaft 1 (N=Z1/Z2 where Z1 represents the number of teeth of the ring gear 6 and Z2 represents the difference in the number of teeth between the ring gear 6 and the planetary gear 5) are completed, the coupling shaft 2 and the inner blade 3 are returned into their initial positions. During the N rotations of the drive shaft 1, the inner blade 3 becomes partially exposed exteriorly of the work W at N positions along the periphery of the work W, with the result that the work W is cut throughout its entire circumference.

As compared with the arrangement including the fixing mechanism 9 and the air cylinder 10, the above-described arrangement makes it possible to simplify the structure of the tube cutting apparatus 100 and the control to be performed during the cutting operation, though the time required to cut the work W is lengthened.

It should be noted that any one of the foregoing embodiments is illustrative and not limitative of the present invention and, therefore, various changes and modifications are possible within the scope of the present invention.

The invention claimed is:

1. A tube cutting apparatus comprising:
   an annular outer blade having an inner peripheral surface configured to contact an entire circumference of an outer periphery of a tube to be cut so as to cover a predetermined axial range of the outer periphery;
   a disc-shaped inner blade configured to be retained inside the tube such that a central axis of the disc-shaped inner blade will extend parallel with an axis of the tube, the disc-shaped inner blade having at least one first side surface positioned to substantially coincide with a second side surface of the outer blade in an axial direction of the disc-shaped inner blade; and
   an inner blade driving mechanism having a ring gear and a planetary gear, the ring gear configured to be positioned outside the tube coaxially with the tube and the planetary gear having external teeth meshing with internal teeth of the ring gear, wherein:
   the inner blade driving mechanism is configured to move the planetary gear along a pitch circle of the ring gear and has a first shaft and a second shaft, central axes of the first and second shafts being disposed parallel to one another;
   the first shaft is a central axis of the planetary gear;
   the second shaft supports the inner blade for rotation and the second shaft is rotatably supported at a predetermined position which is different from a position of the first shaft in a plane perpendicular to the first shaft;
   the inner blade has a peripheral surface which is caused to become exposed exteriorly of the tube from the inside of the tube, thereby cutting the tube cooperatively with the outer blade; and
   the inner blade driving mechanism further includes:
      a drive shaft configured to be rotatably supported inside the tube coaxially with the tube, the drive shaft defining a bore which extends therethrough at an eccentric position within the drive shaft, has a circular cross section, and is open at opposite ends of the drive shaft,
         wherein the first shaft is a cylindrical coupling shaft which is rotatably supported in the bore and has a first end portion configured to be positioned inside the tube and a second end portion coaxially fixed to the planetary gear, and
         wherein the second shaft is an eccentric shaft which is fixed to the first end portion of the coupling shaft and supports the inner blade for rotation at an eccentric position decentered from a central axis of the coupling shaft; and
      a driving device which transmits rotation to the drive shaft.

2. The tube cutting apparatus according to claim 1, further comprising:
   a restraint device which selectively restrains rotation of the ring gear;
   a fixing device which selectively fixes the ring gear and the planetary gear together;
   a detection device which detects a rotational position of the drive shaft; and
   a control device which controls an operation of the restraint device and an operation of the fixing device based on a result of detection by the detection device, wherein:
   the ring gear is rotatably supported coaxially with the drive shaft; and
   the control device is configured to enable the restraint device and disable the fixing device during rotation of the drive shaft through a predetermined angle from an initial rotational position as well as to disable the restraint device and enable the fixing device during one rotation of the drive shaft after the drive shaft has rotated through the predetermined angle.

3. The tube cutting apparatus according to claim 2, wherein:
   the driving device is configured to transmit forward rotation and to transmit backward rotation to the drive shaft selectively; and
   the control device is configured to cause the driving device to transmit the forward rotation to the drive shaft during the one rotation of the drive shaft after the drive shaft has rotated through the predetermined angle from the initial rotational position and to transmit the backward rotation to the drive shaft until the drive shaft returns to the initial rotational position after the one rotation of the drive shaft from the position of the drive shaft having rotated through the predetermined angle has been completed.

4. The tube cutting apparatus according to claim 3, wherein the outer blade includes a pair of outer blades spaced apart to define a gap extending therethrough so as to be opposed to the inner blade and is configured to contact the outer periphery of the tube in two opposite regions across the gap in the axial direction of the disc-shaped inner blade, while the second side surfaces of the outer blade which face each other across the gap in the axial direction of the disc-shaped inner blade are each positioned to substantially coincide with a respective one of the first opposite side surfaces of the inner blade.

5. The tube cutting apparatus according to claim 2, wherein the outer blade includes a pair of outer blades spaced apart to define a gap extending therethrough so as to be opposed to the inner blade and is configured to contact the outer periphery of the tube in two opposite regions across the gap in the axial direction of the disc-shaped inner blade, while the second side surfaces of the outer blade which face each other across the gap in the axial direction of the disc-shaped inner blade are each positioned to substantially coincide with a respective one of the first opposite side surfaces of the inner blade.

6. The tube cutting apparatus according to claim 1, wherein the outer blade includes a pair of outer blades spaced apart to define a gap extending therethrough so as to be opposed to the inner blade and is configured to contact the outer periphery of the tube in two opposite regions across the gap in the axial direction of the disc-shaped inner blade, while the second side surfaces of the outer blade which face each other across the gap in the axial direction of the disc-shaped inner blade are each positioned to substantially coincide with a respective one of the first opposite side surfaces of the inner blade.

\* \* \* \* \*